US010567810B2

(12) United States Patent
Beattie, Jr. et al.

(10) Patent No.: US 10,567,810 B2
(45) Date of Patent: *Feb. 18, 2020

(54) METHOD AND APPARATUS FOR MANAGING BANDWIDTH IN PROVIDING COMMUNICATION SERVICES

(71) Applicant: AT&T Intellectual Property I, L.P., Atlanta, GA (US)

(72) Inventors: James G. Beattie, Jr., Bergenfield, NJ (US); Stephen Francis Triano, Hillsborough, NJ (US); Roque Rios, III, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/916,858

(22) Filed: Mar. 9, 2018

(65) Prior Publication Data
US 2018/0199078 A1    Jul. 12, 2018

Related U.S. Application Data

(63) Continuation of application No. 14/789,239, filed on Jul. 1, 2015, now Pat. No. 9,955,191.

(51) Int. Cl.
*H04N 21/234* (2011.01)
*H04N 21/2187* (2011.01)
(Continued)

(52) U.S. Cl.
CPC ... *H04N 21/23418* (2013.01); *H04N 21/2187* (2013.01); *H04N 21/2343* (2013.01);
(Continued)

(58) Field of Classification Search
CPC ......... H04N 21/23418; H04N 21/2187; H04N 21/2385; H04N 21/2353; H04N 21/42201;
(Continued)

(56) References Cited

U.S. PATENT DOCUMENTS 4,707,738 A    11/1987  Ferre et al.
5,390,259 A     2/1995  Withgott et al.
(Continued)

FOREIGN PATENT DOCUMENTS

CA        2672735 A1    6/2008
CN      102037730 B     6/2013
(Continued)

OTHER PUBLICATIONS

"IPS Motion Detection (Axis)", IPS, ips-analytics.com, Accessed: May 27, 2015.
(Continued)

*Primary Examiner* — Benjamin R Bruckart
*Assistant Examiner* — Tien M Nguyen
(74) *Attorney, Agent, or Firm* — Guntin & Gust, PLC; Douglas Schnabel

(57) ABSTRACT

Aspects of the subject disclosure may include, for example, obtaining data that is captured by a device, obtaining metadata corresponding to the data where the metadata describes a context of the capturing of the data, analyzing the metadata to identify a segment context of a segment of the data without performing an image recognition for the segment of the data, and, responsive to a determination that the context does not satisfy a context criterion, generating a low bandwidth version of the segment and transmitting the low bandwidth version of the segment of the data, wherein the low bandwidth version is transmitted at a second bandwidth that is lower than the first bandwidth. Other embodiments are disclosed.

20 Claims, 6 Drawing Sheets

(51) Int. Cl.
  *H04N 21/2385* (2011.01)
  *H04N 21/235* (2011.01)
  *H04N 21/647* (2011.01)
  *H04N 21/2343* (2011.01)
  *H04N 21/422* (2011.01)
  *H04N 21/845* (2011.01)

(52) U.S. Cl.
  CPC ..... *H04N 21/2353* (2013.01); *H04N 21/2385* (2013.01); *H04N 21/42201* (2013.01); *H04N 21/64738* (2013.01); *H04N 21/8456* (2013.01)

(58) Field of Classification Search
  CPC ......... H04N 21/64738; H04N 21/2343; H04N 21/8456
  See application file for complete search history.

(56) References Cited

U.S. PATENT DOCUMENTS

| | | | |
|---|---|---|---|
| 5,896,176 | A | 4/1999 | Talluri Rajendra et al. |
| 5,970,173 | A | 10/1999 | Chen Wei-Ge et al. |
| 7,359,955 | B2 | 4/2008 | Menon et al. |
| 7,533,406 | B2 | 5/2009 | Ludvig et al. |
| 7,548,565 | B2 | 6/2009 | Sull et al. |
| 7,707,485 | B2 | 4/2010 | Laksono et al. |
| 7,756,202 | B2 | 7/2010 | Asamura et al. |
| 7,903,732 | B2 | 3/2011 | Shindo |
| 8,521,541 | B2 | 8/2013 | Yi et al. |
| 8,625,607 | B2 | 1/2014 | Rieger et al. |
| 8,780,756 | B2 | 7/2014 | Ogikubo et al. |
| 8,891,934 | B2 | 11/2014 | Messmer et al. |
| 2003/0033318 | A1* | 2/2003 | Carlbom ............ G06F 17/30793 |
| 2006/0227870 | A1 | 10/2006 | Tian et al. |
| 2007/0279494 | A1 | 12/2007 | Aman et al. |
| 2009/0290645 | A1* | 11/2009 | Mabey ............... H04N 5/23203 375/240.25 |
| 2010/0097473 | A1 | 4/2010 | Park et al. |
| 2010/0123830 | A1* | 5/2010 | Vunic ................ G06K 9/00711 348/700 |
| 2012/0106669 | A1* | 5/2012 | Rao ....................... H04N 19/172 375/295 |
| 2012/0141089 | A1* | 6/2012 | Hunt ................ H04N 21/23439 386/239 |
| 2013/0254341 | A1 | 9/2013 | Ramakrishnan et al. |
| 2013/0259446 | A1* | 10/2013 | Sathish ................ G11B 27/034 386/278 |
| 2014/0181266 | A1 | 6/2014 | Joch et al. |
| 2014/0201382 | A1 | 7/2014 | Shivadas et al. |
| 2014/0314139 | A1 | 10/2014 | Xia et al. |
| 2015/0026358 | A1 | 1/2015 | Zhang |
| 2015/0229980 | A1 | 8/2015 | Reisner |
| 2017/0006320 | A1 | 1/2017 | Beattie |

FOREIGN PATENT DOCUMENTS

| | | |
|---|---|---|
| GB | 2098826 A | 11/1982 |
| GB | 2351406 A | 12/2000 |
| JP | 2004120786 A | 4/2004 |
| WO | 2007038701 A1 | 4/2007 |
| WO | 2012103332 A2 | 8/2012 |
| WO | 2014160378 A1 | 10/2014 |

OTHER PUBLICATIONS

"Light Streamer®—Real-Time Data Push", WesWit, lightstreamer.com, Jan. 20, 2015.

Duval, Nils, "Encoding workflow with Handbrake", VideoStitch, video-stitch.com, Oct. 8, 2013.

Kapoor, Abhinav, "ActionScript guide to dynamic streaming", Adobe, adobe.com, Jan. 12, 2009.

Li, Ying et al., "An Overview of Video Abstraction Techniques", Imaging Systems Laboratory, HP Laboratories Palo Alto, HPL-2001-191, Jul. 31, 2001.

* cited by examiner

100

METHOD AND APPARATUS FOR MANAGING BANDWIDTH IN PROVIDING COMMUNICATION SERVICES

CROSS-REFERENCE TO RELATED APPLICATION(S)

This application is a continuation of U.S. patent application Ser. No. 14/789,239, filed Jul. 1, 2015. All sections of the aforementioned application(s) are incorporated herein by reference in their entirety.

FIELD OF THE DISCLOSURE

The subject disclosure relates to a method and apparatus for managing bandwidth in providing communication services.

BACKGROUND

The demand for more communication services, including video and data services over wireless and wired networks, is increasing. Network traffic is continuously increasing as this demand grows. Steps to alleviate congestion and inefficiency due to the growth of network traffic are being taken including improving infrastructure to enable more efficient transmitting of traffic.

The delivery of UltraHD and other high-format content can put a further strain on a network. Resource and load management can be utilized to mitigate some of that strain.

BRIEF DESCRIPTION OF THE DRAWINGS

Reference will now be made to the accompanying drawings, which are not necessarily drawn to scale, and wherein.

DETAILED DESCRIPTION

Figure 1:
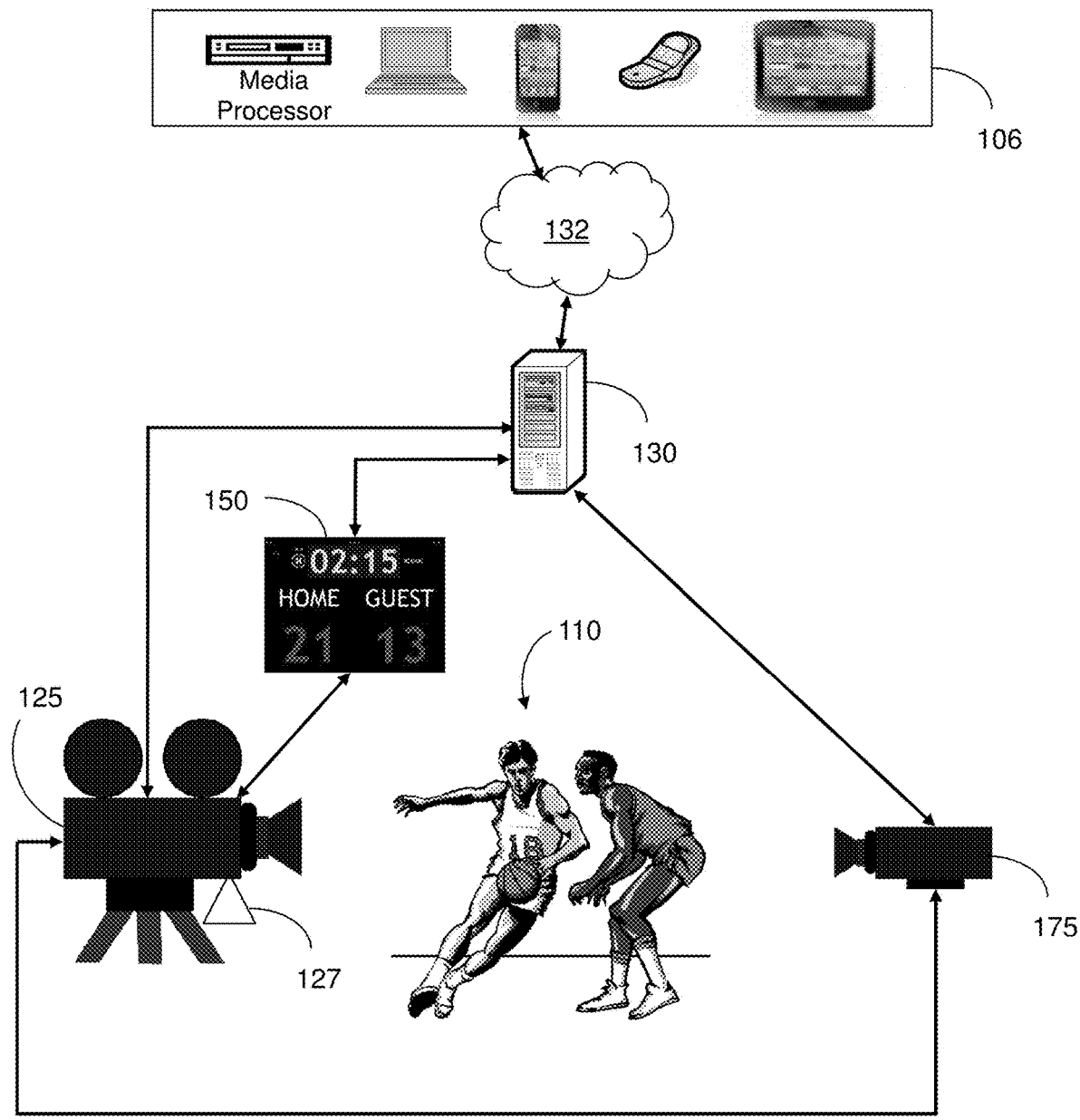
FIGS. 1 and 2 depict illustrative embodiments of systems for delivering different versions of segments of captured content or data to end user device(s)

The subject disclosure describes, among other things, illustrative embodiments for determining a context for segments of content or data that has been captured. A bandwidth can then be determined for distributing the segments of the content or data according to the context. Other embodiments are described in the subject disclosure.

One or more aspects of the subject disclosure can include generating metadata describing, or otherwise indicative of, the context in which the content or data was captured. In one or more embodiments, the metadata can be descriptive, or otherwise indicative, of where, when and/or how an image(s), audio and/or other data was captured. In one or more embodiments, the metadata can be analyzed to determine parameters or constraints to utilize for providing or delivering the images(s), audio and/or data to one or more other devices, such as over a network. The providing of the images(s), audio and/or data can be by way of various techniques including multicast, unicast, broadcast, multicast-broadcast single-frequency network delivery, and so forth. As an example, the context of a segment of video content can be analyzed to determine whether to send a reduced frame rate and/or compressed version or to send a full frame-rate and/or full-resolution version to an end user device(s). In one embodiment, the metadata can be generated by, and/or added at, a source device capturing the content or data, such as a video camera or a data capture device. In another embodiment, the metadata can be generated by, and/or added at, another device that is along the communication path from the source device to the recipient device(s). In one embodiment, the metadata can be added automatically without user intervention or user input.

In one embodiment, the determination as to the desired bandwidth for delivery of the content or data can be based on the metadata without performing any image analysis, such as without performing an MPEG-style analysis of the pixels in the image or other image recognition for the images. In another embodiment, the determination as to the desired bandwidth for delivery of the content or data can be based on the metadata without performing any analysis of the content or data. In one embodiment, the selection of the bandwidth, such as a higher version or lower version of the content with different frame rates and/or resolutions can be determined in part according to one or more operational parameters of the recipient device(s), such as whether the content is being transmitted to a large-screen display device or being transmitted to a handheld device.

One embodiment of the subject disclosure includes a device having a processor and a memory that stores executable instructions that, when executed by the processor, facilitate performance of operations, including receiving, from a video camera, video content captured by the video camera. The processor can receive metadata corresponding to the video content where the metadata describes a context of the video content and can analyze the metadata to identify a segment context of a segment of the video content without performing an image recognition for images of the segment. The processor can compare the segment context to a context criterion. Responsive to a first determination that the segment context satisfies the context criterion, the segment of the video content can be transmitted at a first bandwidth for presentation at an end user device. Responsive to a second determination that the segment context does not satisfy the context criterion, a low bandwidth version of the segment can be generated and transmitted for presentation at the end user device, where the low bandwidth version is transmitted at a second bandwidth that is lower than the first bandwidth.

One embodiment of the subject disclosure is a method that includes obtaining, by a system including a processor, video content; and obtaining, by the system, metadata corresponding to the video content, the metadata describing a context of the video content. The method includes analyzing, by the system, the metadata to identify a segment context of a segment of the video content without performing an image recognition for images of the segment. Responsive to a first determination that the segment context satisfies a context criterion, the system can transmit the segment of the video content at a first bandwidth for presentation at an end user device. Responsive to a second determination that the context does not satisfy the context criterion, the system can generate a low bandwidth version of the segment and can transmit the low bandwidth version of the segment of the video content for presentation at the end user device, where the low bandwidth version is transmitted at a second bandwidth that is lower than the first bandwidth.

One embodiment of the subject disclosure includes a machine-readable storage device, including executable instructions that, when executed by a processor, facilitate performance of operations. The operations can include obtaining data that is captured by a device and obtaining metadata corresponding to the data, where the metadata describes a context of the capturing of the data. The operations can include analyzing the metadata to identify a segment context of a segment of the data without performing an image recognition for the segment of the data. Responsive to a first determination that the segment context satisfies a context criterion, the processor can transmit the segment of the data at a first bandwidth. Responsive to a second determination that the context does not satisfy the context criterion, the processor can generate a low bandwidth version of the segment and can transmit the low bandwidth version of the segment of the data, wherein the low bandwidth version is transmitted at a second bandwidth that is lower than the first bandwidth.

FIG. 1 depicts an illustrative embodiment of a system 100 that enables or facilitates utilizing dynamic bandwidth adjustment for the delivery of content or data to be provided to recipient device(s) 106. The exemplary embodiment of system 100 is described with respect to content (e.g., video content) being captured at an event 110 (e.g., a basketball game). However, the captured information can be any type of content including audio content and/or still images, and/or can be data captured by a data capture device (e.g., motion data, temperature data, light data, and so forth). The event 110 can be any type of an event, including live events such as sports, concerts, parades, and can be other types of events such as security monitoring of a facility.

In this example, the content can be captured by a source device, which is illustrated as video camera 125, however, the source device can be any type of device capable of capturing the particular content from the event 110. In this example, the video camera 125 can provide the captured video content to a server 130, which can be a network server located in a network facility remote from the event 110 and/or can be another server such as located in a production vehicle in proximity to the event. System 100 can include various network devices, including routers, switches, servers, and so forth (not shown), which enable transmitting of the content over a network 132 to one or more recipient devices 106. The network 132 can utilize various techniques and/or combinations of techniques (including one or more communication protocols) for transmitting the content or data. The network 132 can utilize wireless communications and/or wired communications. The server 130 can be part of the network 132 or can be a computing device in communication with the network 132, such as operated by a different service provider or third party vendor.

In one or more embodiments, metadata can be generated describing, or otherwise indicative of, the context of the capturing of the content. In one embodiment, the metadata can be generated by the video camera 125, such as according to contextual information detected by one or more context sensors 127 of the video camera 125. In this example, the contextual information can be various types of information, such as motion data, lighting data, time data, an orientation or position of the video camera 125, or other data that describes or is otherwise indicative of a context of the capturing of the content by the video camera 125. For instance, the context sensor 127 can be a motion sensor directed to the basketball court of event 110 so that a context determination can be made as to when the captured video is during the basketball game being played (e.g., a detection of motion on the court) or when the captured video is during a time out (e.g., a detection of no motion on the court). In this example, the motion detection can be directed to a particular area of the basketball court where it is likely that detected motion is indicative of on-going play. As another example, time data can be used to determine the context of the captured content, such as the basketball game being scheduled to commence at a particular time and estimated to be at half-time or finished by a particular time. In another embodiment, the time data can be information from the actual game time clock as will be described herein. In another embodiment, the motion detector can detect motion at the scoreboard so that changing of the time or changing of the score can be detected which indicates on-going play. In this example, the motion detection can be utilized without determining the actual time or actual score since it is the changing of the time or score that is indicative of the on-going game of event 110.

In another embodiment, the metadata can be generated by the video camera 125 according to contextual information provided to the video camera by another device(s). In one embodiment, contextual information can be provided by a device(s) 150 that is part of, or operates in conjunction with, the event 110, such as a scoreboard, a game clock, an event lighting controller, an event sound system, and so forth. The device(s) 150 can provide event-related information from which the metadata can be generated. As an example, a game clock 150 in a scoreboard can communicate time information to the video camera 125 so that the video camera can determine when the game clock is counting down and thus detect that game play is active. Metadata can be generated from this time information indicating that the concurrently captured content is during active game play (which can trigger a higher bandwidth delivery of the content as will be described herein).

The contextual information from which the metadata is generated can be other types of information, such as lighting data where lower level lighting or the use of a spotlight indicates that an event (e.g. a concert) is active while a higher level of lighting or the spotlight being off indicates that the event is in an intermission or otherwise not active. In one embodiment, audio content can be utilized as the contextual information to determine when the event is active such as loud noise during a sporting event indicating active game play. In one or more embodiments, the metadata can include the collected or received contextual information and/or can include a status indicator determined from the contextual information, such as active or inactive describing the concurrently captured video content. In one or more embodiments, the contextual information can be a measurement associated with information that is indicative of the present context of the event 110. For example, a measurement of sound levels at a concert or at a racetrack can indicate when the concert or race is active as opposed to at an intermission. In another example, detection of a whistle at a basketball game can indicate a stoppage of play which can trigger adjusting down the bandwidth until it is determined that active play has resumed (e.g., according to a default timer such as twenty seconds after the whistle, another detected whistle indicating play has resumed, motion sensor data indicating play has resumed, and so forth).

In one embodiment, the contextual information can be provided by a device(s) 175 that is not part of, or does not operate in conjunction with, the event 110, such as a separate contextual sensor (e.g. a motion detector, a lighting detector, an audio level detector, and so forth). The device(s) 175 can provide event-related information from which the metadata can be generated. As an example, a motion detector 175 can determine when there is motion on the basketball court (or a particular area of the basketball court). Metadata can be generated from this motion data indicating that the concurrently captured content is during active game play (which can trigger a higher bandwidth delivery of the content as will be described herein). In one or more embodiments, the metadata can include the collected or received contextual information and/or can include a status indicator determined from the contextual information, such as active or inactive describing the concurrently captured video content.

In one embodiment, the video camera 125 can add the metadata to the captured content which is then provided to the server 130. In another embodiment, the metadata or the contextual information from which the metadata is determined can be provided by the device(s) 150 and/or 175 directly to the server 130 without providing the metadata or contextual information to the video camera 125.

In one or more embodiments, the metadata, corresponding to segments of the captured video content, can be analyzed to determine the bandwidth for delivery of that particular segment. The metadata analysis can be performed by the server 130 and/or by another device that has the capability of causing a switch between different delivery bandwidths for the video content. As an example, higher resolution and/or higher frame rate video content may be desirable for a user of a recipient device 106 when the basketball game of event 110 is active, but a lower resolution and/or lower frame rate may be acceptable for the user during a time out or during half-time when commentators are talking. The server 130 can receive and analyze the metadata and cause delivery of the video content at either a higher resolution and/or higher frame rate or at a lower resolution and/or lower frame rate according to the context (e.g., active play or time out).

In one or more embodiments, any number of different versions (e.g., having different frame rates and/or resolution) of the video content can be utilized during the transmitting of the segments of the video content. As an example, the metadata can be used to determine three types of segment contexts: active (e.g., segment delivered utilizing highest bandwidth with the highest frame rate and/or highest resolution), semi-active (e.g., segment delivered utilizing a medium bandwidth with a medium frame rate and/or medium resolution), and non-active (e.g., segment delivered utilizing a lowest bandwidth with a lowest frame rate and/or lowest resolution). In this example, the active segment context can be utilized for live play, the semi-active segment context can be used for time-outs where the players are being captured in the video content, and the non-active segment context can be utilized for commentators during an intermission.

The generating of different versions can also be based on other factors, such as device capability of recipient devices, network traffic conditions, subscription plans, quality of service agreements, type of content, and so forth. Continuing with the example above, a switch from delivery of the highest bandwidth content to the medium bandwidth content can be made according to a detection of network traffic exceeding a traffic threshold or a determination of some other network condition. In this example, once a detection is made (based on the metadata) that that event has transitioned from active to non-active status, then a further switch from delivery of the medium bandwidth content to the lowest bandwidth content can be made. Upon a further detection that the event 110 has become active (or based on some other triggering event such as a change in network conditions or a default time limit) then a switch back to delivery of content at the medium bandwidth or the highest bandwidth can be made.

The switching between different versions of the content at different bandwidths can be performed automatically and dynamically throughout the duration of the event 110 or a portion thereof. In one embodiment, a minimum delay or time period between switching of bandwidth versions can be implemented. In another embodiment, the particular length of the segment to which the metadata content information applies can vary and can be based on a number of factors including type of content, communication protocol(s) being utilized for delivery, resources available, length of time since last switch of content version, and so forth.

The generating of the different versions of the content, such as at different frame rates and/or different resolutions can be performed at various devices. For example, the server 130 can receive the highest frame rate and/or highest resolution from the video camera 125 (e.g. a single version of the segment of the content) and can then generate one or more other bandwidth versions (e.g., at lower frame rates and/or lower resolutions) for that segment. In one example, the server 130 can generate the additional different versions for all segments and then a determination can be made as to which version is to be delivered (or different versions to be delivered to different recipient devices 106). In another example, the server 130 can generate a different version only if the determined context (based on an analysis of the metadata) indicates that a different version is needed for the segment for delivery to the recipient device(s). In this example, if the context does not indicate that a different version is needed then the server 130 may not generate an alternative version of the segment of the content.

In another embodiment, the server 130 can communicate with the video camera 125 to cause the video camera to change the frame rate and/or resolution at which the video content is captured. As an example, the server 130 can receive metadata (e.g., from the video camera 125, the scoreboard 150, and/or the sensor 175) and can determine a context from that metadata. According to the context determination, the server 130 can then transmit a video capture instruction to the video camera 125 causing a change in frame rate and/or resolution being utilized by the video camera. The server 130 can repeat the receiving and analyzing of the metadata and the transmitting of the capture instructions to the video camera 125 throughout the duration of the event 110 or a portion thereof.

In one embodiment, multiple devices can generate the different versions of the content according to a determination of the context from the metadata. For example, the server 130 can generate a highest bandwidth version and a lowest bandwidth version and can deliver both versions to another network server which can then determine which version to be delivered to the recipient device(s) and/or can generate a medium bandwidth version for delivery 9 at the other network server). A distributed environment for generating and transmitting different bandwidth versions of the content can be utilized under a number of different scenarios including where different network servers have different capabilities and/or provide communication services to different groups of recipient devices that have different capabilities and/or different quality of service requirements.

In one embodiment a device or combination of devices of system 100, such as server 130, video camera 125 and/or some other device can perform operations including: accessing metadata corresponding to video content captured by a video camera where the metadata describes a context of the video content; analyzing the metadata to identify a segment context of a segment of the video content without performing an analysis of images of the segment; comparing the segment context to a context criterion; responsive to a first determination that the segment context satisfies the context criterion, transmitting the segment of the video content at a first bandwidth for presentation at an end user device; and responsive to a second determination that the segment context does not satisfy the context criterion, generating a low bandwidth version of the segment and transmitting the low bandwidth version of the segment of the video content for presentation at the end user device, wherein the low bandwidth version is transmitted at a second bandwidth that is lower than the first bandwidth.

In one embodiment, the metadata can be generated without analyzing the content. In one embodiment, the metadata can be generated contemporaneously with the capturing of the video content. In one embodiment, the metadata can be received from a communication device other than the video camera. In one embodiment, the communication device can be a sensor that senses sensory data associated with the event. In one embodiment, the sensory data includes motion data, time data, or a combination thereof. In one embodiment, the metadata is received from a sensor integrated with the video camera. In one embodiment, a determination of the second bandwidth can be made according to network traffic. In one embodiment, a determination of the second bandwidth can be made according to operational parameters associated with the end user device. In one embodiment, the transmitting at the second bandwidth can utilize a lower resolution, a lower frame rate or a combination thereof compared to the transmitting at the first bandwidth.

Figure 2:
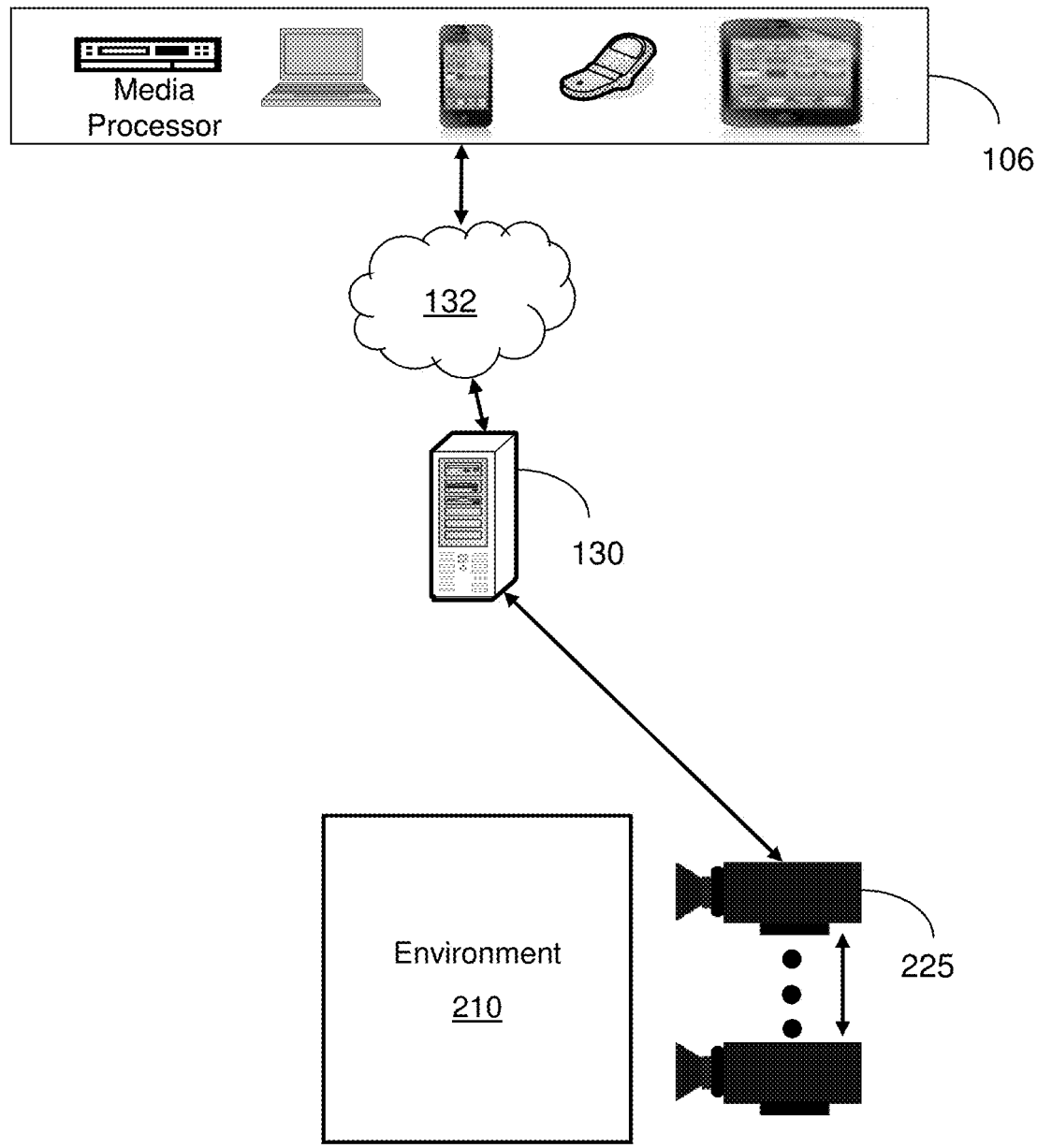

FIG. 2 depicts an illustrative embodiment of a system 200 that enables or facilitates content or data to be provided to recipient device(s) 106 utilizing dynamic bandwidth adjustment for the delivery. The exemplary embodiment is described with respect to data being captured at an environment 210 (e.g., a security footage at a monitored facility). However, the captured information can be any type of data, such as motion data, temperature data, light data, and so forth, and can also include content such as video content, audio content and/or still images. The environment 210 is not limited to a facility and can be any location from which data can be collected, where the data can be delivered utilizing different bandwidth versions of the data according to a context of capturing the data.

In this example, the data can be captured by one or more devices 225 such as a video camera, a data sensor and so forth. The metadata indicative of the context of capturing segments of the data can be generated by the one or more devices 225. In one embodiment different devices 225 can be used for capturing the data and generating the metadata. In another embodiment, the same device(s) 225 can be used for both capturing the data and generating the metadata.

As an example, the environment 210 can be a facility that is being monitored. A first device 225 can be a video camera capturing video content for the environment. A second device 225 can be a motion detector obtaining motion data and generating metadata from the motion data. In this example, the motion data can be utilized to determine when there is potentially activity in the environment, such as motion of a person being detected at the environment. Based on an analysis of the metadata indicating potentially activity in the environment, a higher bandwidth version of the video content can be sent to a recipient device 106. For instance, a higher frame rate and higher resolution video content may be desired if there is potential activity at the environment, so that the environment can be more closely evaluated, whereas a lower frame rate and lower resolution video content may be desired when no potential activity is detected for the environment.

In this example, the device(s) 125 can provide the data and/or metadata to the server 130, which can be a network server located in a network facility remote from the event 110 and/or can be another server such as located in a monitor station or a third party security facility. In another embodiment, one or more first devices 225 can provide the metadata to one or more second devices 225 that captured the data. A combination of the data and the metadata can then be provided to the server 130.

In one or more embodiments, the different versions of the data can be generated by the server 130 based on the captured data (e.g. a high bandwidth version of the captured data) received from the device(s) 225 and according to an analysis of the metadata to interpret the context of capturing the data (e.g., who, what, and/or when). In another embodiment, the different versions of the captured data can be generated by the device(s) 225 capturing the data according to instructions from the server 130, such as a first instruction to switch to a higher bandwidth version of video content (e.g. full frame rate and higher resolution) because the metadata is indicative of activity occurring at the environment 210 and a second instruction to switch to a lower bandwidth version of the video content (e.g. partial frame rate and lower resolution) because the metadata is indicative of no activity occurring at the environment 210.

Figure 3:
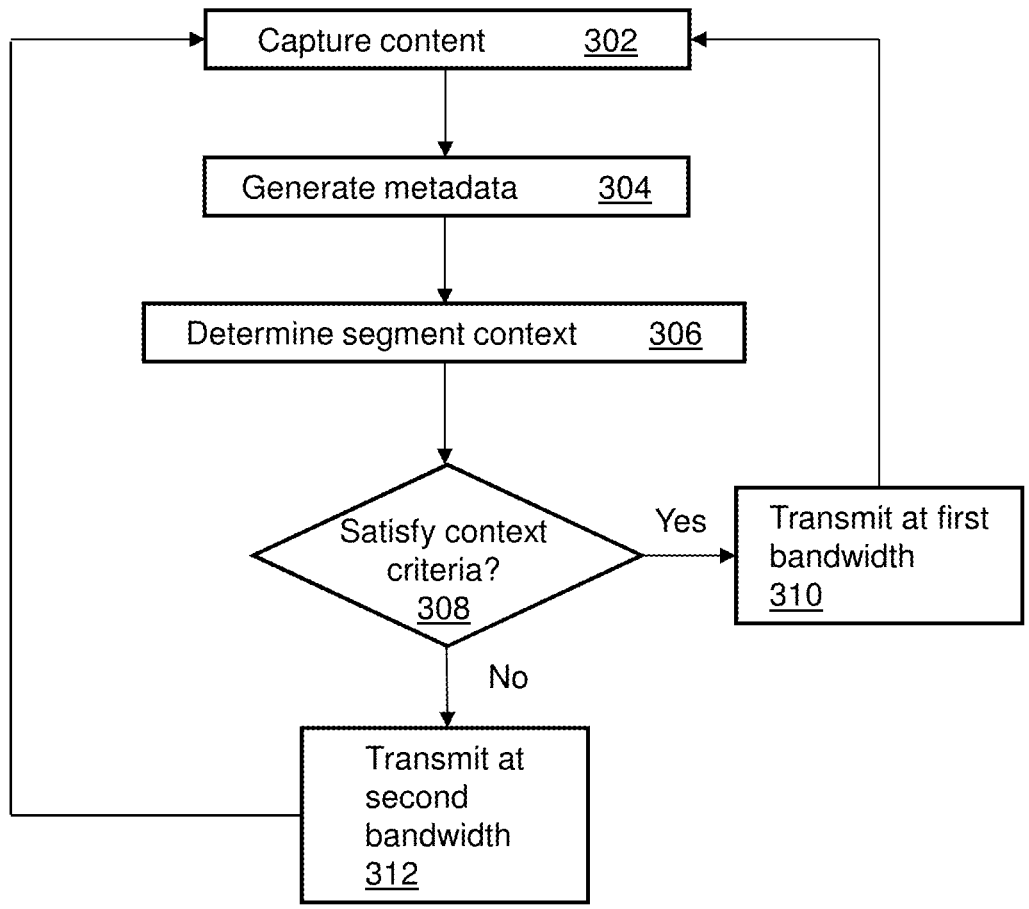
FIG. 3 depicts an illustrative embodiment of a method used in portions of the systems described in FIGS. 1 and 2.

FIG. 3 depicts an illustrative embodiment of a method 300 used by one or more devices systems 100 and 200 of FIGS. 1 and 2, respectively. Method 300 is described with respect to capturing content, however, the captured information can include any type of data being captured, such as at the event 110 or the environment 210.

At 302, content can be captured by one or more devices, such as video camera 125 or data capturing device 22. At 304, metadata corresponding to segments of the content can be generated, where the metadata describes or is otherwise indicative of a context of the capturing of the content. The metadata can be generated by the same device(s) that captured the content and/or can be generated by a device(s) different from the capturing device.

At 306, the metadata can be generated to identify a segment context of a segment of the content. In one embodiment, the identification of the segment context is performed without performing any analysis of images of the segment. In one embodiment, the metadata is generated without performing any analysis of the captured content. In one embodiment, time data, such as time stamps, can be utilized with the metadata and the captured content to facilitate identification of the segment content and determining the metadata that corresponds to a particular content segment.

At 308, a determination can be made as to whether the segment context for the particular segment satisfies a context criterion. The context criterion can be indicative of whether the content segment includes a level activity that is desirable to be delivered to the recipient device(s) 106 at a higher bandwidth, such as the context criterion being movement on the basketball court or sound at the concert above a particular decibel level, which are indicative that the game or the concert are on-going and not at an intermission. Responsive to a first determination that the segment context satisfies the context criterion, at 310, the segment of the video content can be delivered or transmitted at a first bandwidth (e.g., a first frame rate and/or first resolution) for presentation at one or more end user devices. Responsive to a second determination that the context does not satisfy the context criterion, at 312, a low bandwidth version of the segment (e.g., a second frame rate and/or second resolution) can be delivered or transmitted for presentation at the one or more end user devices. In this example, the low bandwidth version is transmitted at a second bandwidth that is lower than the first bandwidth. As described above, the particular device(s) utilized for capturing the content, generating the metadata, analyzing the metadata to identify a context for a particular segment, and/or determining whether a switch between different bandwidth versions of the content, can vary.

In one embodiment, obtaining or generating metadata can include receiving sensory data from a communication device where the sensory data includes motion data, sound data, and/or time data. In one embodiment, the determining of the second bandwidth to be utilized can be based on network traffic or other network conditions. In one embodiment, the determining of the second bandwidth can be according to operational parameters associated with the end user device(s) receiving the content.

Figure 4:
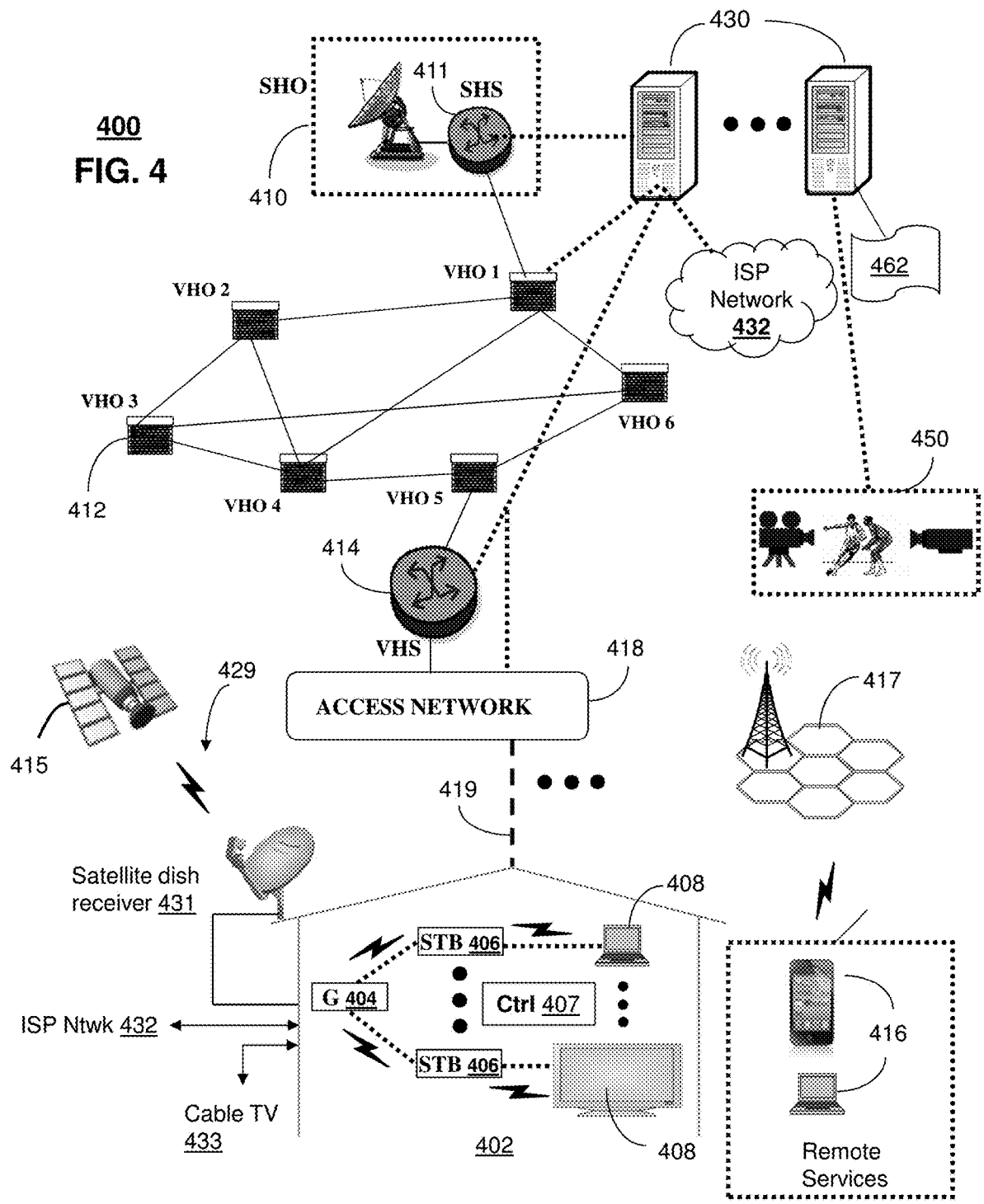
FIG. 4 depicts an illustrative embodiment of a communication system that provides media services including delivering different versions of captured content or data to end user device(s)

FIG. 4 depicts an illustrative embodiment of a communication system 400 for delivering media content. The communication system 400 can represent an Internet Protocol Television (IPTV) media system or other interactive television system. Communication system 400 can be overlaid or operably coupled with systems 100 and/or 200 of FIGS. 1 and/or 2 as another representative embodiment of communication system 400. For instance, one or more devices illustrated in the communication system 400 of FIG. 4 can determine a context for content or data that has been captured at an event 450 and can determine a bandwidth for distributing the content or data according to the context. The event 450 can have various devices positioned thereat for capturing the content or data and generating the metadata indicative of the context of capturing the segments of the content or data, such as described with respect to systems 100 and 200 of FIGS. 1 and 2.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a bandwidth selection server 430 (herein referred to as server 430). The server 430 can use computing and communication technology to perform function 462, which can include among other things: receiving, from a capturing device (such as a video camera), information (e.g., content or data) captured by the capturing device; receiving metadata corresponding to the captured information where the metadata describes a context of the captured information; analyzing the metadata to identify a segment context of a segment of the captured information without performing an analysis of the captured information; comparing the segment context to a context criterion; responsive to a first determination that the segment context satisfies the context criterion, transmitting the segment of the captured information at a first bandwidth for presentation at an end user device; and responsive to a second determination that the segment context does not satisfy the context criterion, generating a low bandwidth version of the segment and transmitting the low bandwidth version of the segment of the captured information for presentation at the end user device, where the low bandwidth version is transmitted at a second bandwidth that is lower than the first bandwidth. For instance, function 462 of server 430 can be similar to the functions described for server 130 of FIGS. 1 and 2.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
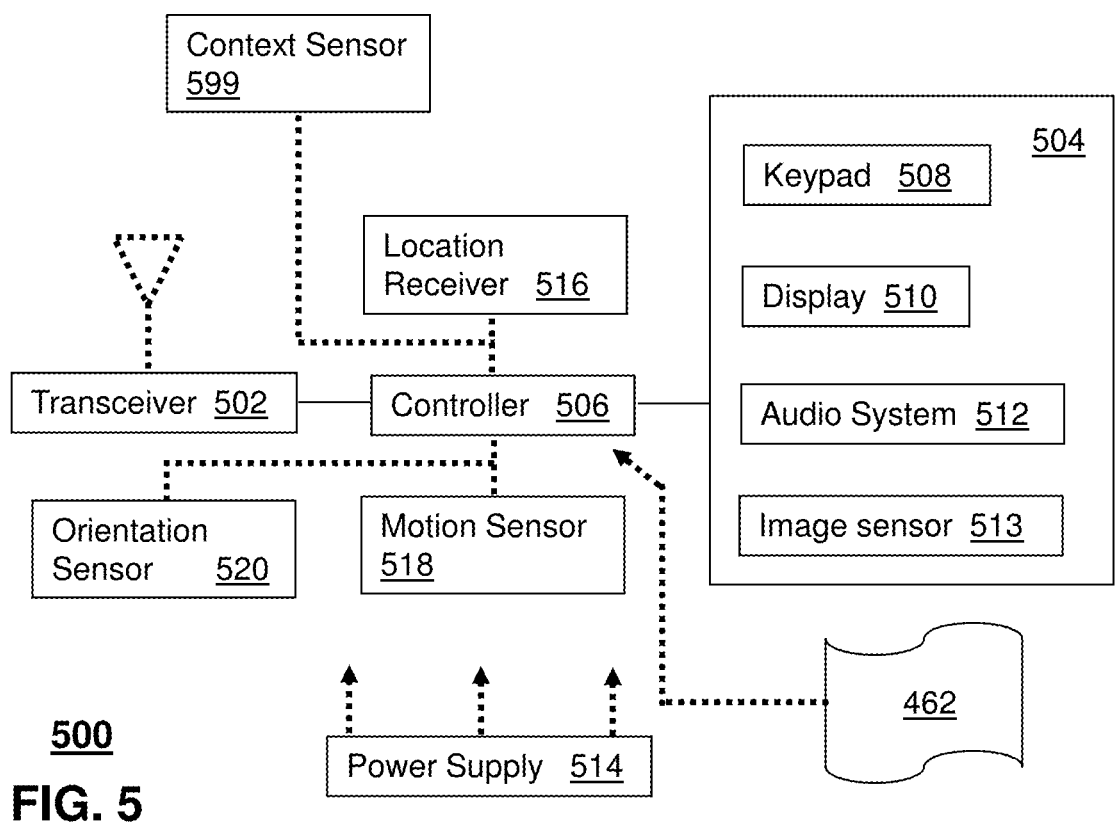
FIG. 5 depicts an illustrative embodiment of a communication device that can be used in a system for delivering different versions of captured content or data to end user device(s)

FIG. 5 depicts an illustrative embodiment of a communication device 500. Communication device 500 can serve in whole or in part as an illustrative embodiment of the devices depicted in FIGS. 1, 2 and/or 4 and can be configured to perform portions of method 300 of FIG. 3. As an example, communication device 500 can be a data capturing device that captures content or data for delivery to end user devices at different bandwidths depending on the context of capturing of the content or data. As another example, communication device 500 can be a data capturing device that captures contextual information, via context sensor 599, representative of or indicative of the context in which content or data was captured, such as obtaining motion data, time data, temperature data, lighting data, and so forth. As yet another example, communication device 500 can be a server that analyzes metadata to determine a context for segments of the captured information and determines which bandwidth version is to be utilized in the delivery to the end user devices according to the determined segment context. For instance, communication device 500 can obtain data that is captured by a device and can obtain metadata corresponding to the data where the metadata describes a context of the capturing of the data. Communication device 500 can analyze the metadata to identify a segment context of a segment of the data without performing an analysis of the segment of the data. Responsive to a first determination that the segment context satisfies a context criterion, communication device 500 can transmit the segment of the data at a first bandwidth. Responsive to a second determination that the context does not satisfy the context criterion, communication device 500 can generate a low bandwidth version of the segment and can transmit the low bandwidth version of the segment of the data, where the low bandwidth version is transmitted at a second bandwidth that is lower than the first bandwidth.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure. The communication device 500 can be adapted to perform the functions of the devices of systems 100 and 200 of FIGS. 1 and 2, the media processor 406, the media devices 408, and/or the portable communication devices 416 of FIG. 4. It will be appreciated that the communication device 500 can also represent other devices that can operate in systems 100, 200 and/or 400 such as a gaming console and a media player. In addition, the controller 506 can be adapted in various embodiments to perform the functions 462.

Upon reviewing the aforementioned embodiments, it would be evident to an artisan with ordinary skill in the art that said embodiments can be modified, reduced, or enhanced without departing from the scope of the claims described below. For example, the context of a segment of content can be determined (in conjunction with the metadata analysis or in place of the metadata analysis) based on image pattern recognition to determine context at a conceptual level. For example, pattern recognition can be used to determine a match for pre-game activity (e.g. cheerleaders on the court) or announcers speaking at halftime. This example of pattern recognition can be a cursory image analysis that is indicative of the segment. In this embodiment, metadata indicating the context as determined from the image pattern recognition can be generated and utilized for determining whether the deliver the content as a higher bandwidth version or a lower bandwidth version. In one embodiment, the content capturing device (e.g., the video camera) can utilize Scalable Video Coding (SVC) to generate SVC video. In this example, the pre-generated base layer can be transmitted without transmitting one or more enhancement layers when a determination is made to utilize a lower bandwidth transmitting technique. One or more enhancement layers of the SVC video can then be transmitted in response to a determination to utilize a higher bandwidth delivery technique. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
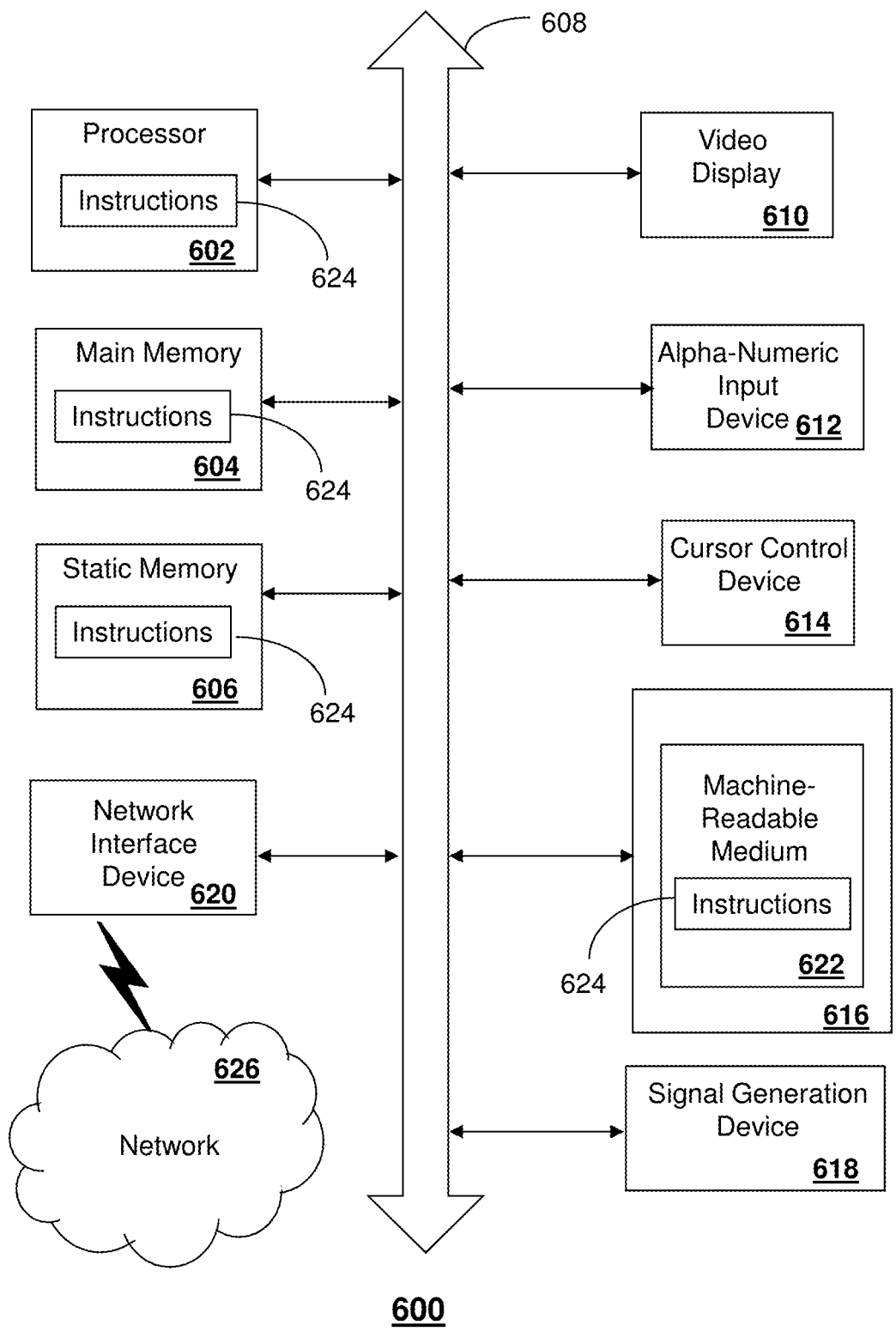
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the server 130 or 430 or other devices of systems 100, 200 and/or 300, such as to determine whether to deliver a high bandwidth version of content or to deliver a low bandwidth version of content according to an analysis of metadata that is indicative of the context in which the content was captured. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium comprising executable instructions that, when executed by a processing system including a processor, facilitate performance of operations, the operations comprising:

identifying, according to sensing data, an image capture context in accordance with metadata that describes a capturing of image data by an image capturing device, wherein the metadata is generated by the image capturing device according to time information provided to the image capturing device by a scoring device, wherein the identifying of the image capture context occurs without performing an image recognition for a segment of the image data, wherein the image data has associated therewith a first bandwidth, wherein the image data is associated with an event, wherein the event comprises a timed sporting event, and wherein the image capture context comprises an active context associated with first images of players during timed play, a semi-active context associated with second images of the players during a time-out, or a non-active context associated with commentators during an intermission;

selecting, responsive to identification of the image capture context, a bandwidth mode for communicating via a communication system, wherein the bandwidth mode comprises a high bandwidth mode, a medium bandwidth mode, or a low bandwidth mode, wherein the high bandwidth mode is selected in accordance with the image capture context being the active context, wherein the medium bandwidth mode is selected in accordance with the image capture context being the semi-active context, and wherein the low bandwidth mode is selected in accordance with the image capture context being the non-active context; and transmitting, to one or more recipient devices via the communication system, the segment of the image data in accordance with the bandwidth mode;

wherein the high bandwidth mode is associated with a first transmission of the segment of the image data at the first bandwidth;

wherein the medium bandwidth mode is associated with a second transmission of a medium bandwidth version of the segment of the image data at a second bandwidth that is lower than the first bandwidth; and wherein the low bandwidth mode is associated with a third transmission of a low bandwidth version of the segment of the image data at a third bandwidth that is lower than the second bandwidth.

2. The non-transitory machine-readable storage medium of claim 1, wherein the second transmission at the second bandwidth utilizes a lower resolution, a lower frame rate or a combination thereof compared to the first transmission at the first bandwidth.

3. The non-transitory machine-readable storage medium of claim 1, wherein the third transmission at the third bandwidth utilizes a lower resolution, a lower frame rate or a combination thereof compared to the second transmission at the second bandwidth.

4. The non-transitory machine-readable storage medium of claim 1, wherein the time information is provided to the image capturing device by the scoring device at the timed sporting event.

5. The non-transitory machine-readable storage medium of claim 1, wherein the image data comprises video content including a plurality of images.

6. The non-transitory machine-readable storage medium of claim 5, wherein the image capturing device comprises a video camera.

7. The non-transitory machine-readable storage medium of claim 1, wherein the first, second and third transmissions comprise wireless communications.

8. The non-transitory machine-readable storage medium of claim 1, wherein the first, second and third transmissions comprise wired communications.

9. The non-transitory machine-readable storage medium of claim 1, wherein the first, second and third transmissions comprise communications via a network element of the communication system.

10. The non-transitory machine-readable storage medium of claim 1, wherein the first, second and third transmissions are to the one or more recipient devices.

11. A device, comprising:
a processing system including a processor; and
a memory that stores executable instructions that, when executed by the processing system, facilitate performance of operations, the operations comprising:
identifying, according to sensing data, a capture context of a video content having associated therewith a first bandwidth, wherein the capture context describes a capturing, by an image capturing device, of the video content associated with a timed sporting event, wherein the capture context comprises an active context, a semi-active context, or a non-active context, wherein the active context is associated with first images of players during timed play, wherein the semi-active context is associated with second images of the players during a time-out, and wherein the non-active context is associated with commentators during an intermission;

selecting, responsive to identification of the capture context, a bandwidth mode for communicating via a communication system, wherein the bandwidth mode comprises a high bandwidth mode, a medium bandwidth mode, or a low bandwidth mode, wherein the high bandwidth mode is selected in accordance with the capture context being the active context, wherein the medium bandwidth mode is selected in accordance with the capture context being the semi-active context, and wherein the low bandwidth mode is selected in accordance with the capture context being the non-active context; and transmitting, to one or more recipient devices via the communication system, a segment of image data in accordance with the bandwidth mode;

wherein the high bandwidth mode is associated with a first transmission of the video content at the first bandwidth;

wherein the medium bandwidth mode is associated with a second transmission of a medium bandwidth version of the video content at a second bandwidth that is lower than the first bandwidth;

wherein the low bandwidth mode is associated with a third transmission of a low bandwidth version of the video content at a third bandwidth that is lower than the second bandwidth;

wherein the identifying of the capture context of the video content occurs in accordance with metadata without performing an image recognition for the segment of the image data; and wherein the metadata is generated by the image capturing device according to time information provided to the image capturing device by a scoring device.

12. The device of claim 11, wherein:
the second transmission at the second bandwidth utilizes a first lower resolution, a first lower frame rate or a combination thereof compared to the first transmission at the first bandwidth; and
wherein the third transmission at the third bandwidth utilizes a second lower resolution, a second lower frame rate or a combination thereof compared to the second transmission at the second bandwidth.

13. The device of claim 11, wherein the processor comprises a plurality of distributed processors.

14. The device of claim 11, wherein the video content is captured by a video camera.

15. The device of claim 11, wherein:
each of the first transmission, the second transmission and the third transmission comprises wireless communications, wired communications, or any combination thereof.

16. A method, comprising:
identifying, by a processing system including a processor, a video capture context associated with a video content of an event, wherein the video capture context describes capturing of the video content by an image capturing device according to sensing data, wherein the event comprises a timed sporting event, wherein the video capture context comprises an active context associated with a first series images of players during timed play, a semi-active context associated with a second series of images of the players during a time-out, or a non-active context associated with commentators during an intermission, and wherein the video content has associated therewith a first bandwidth;

selecting a bandwidth mode for communicating via a communication system, by the processing system, responsive to identification of the video capture context, wherein the bandwidth mode comprises a high bandwidth mode, a medium bandwidth mode, or a low bandwidth mode, wherein the high bandwidth mode is selected based upon the video capture context being the active context, wherein the medium bandwidth mode is selected based upon the video capture context being the semi-active context, and wherein the low bandwidth mode is selected based upon the video capture context being the non-active context; and transmitting, to one or more recipient devices via the communication system, a segment of image data in accordance with the bandwidth mode;

wherein the high bandwidth mode is related to transmission of the video content at the first bandwidth;

wherein the medium bandwidth mode is related to transmission of a medium bandwidth version of the video content at a second bandwidth that is lower than the first bandwidth;

wherein the low bandwidth mode is related to transmission of a low bandwidth version of the video content at a third bandwidth that is lower than the second bandwidth;

wherein the identifying of the video capture context associated with the video content of the event occurs in accordance with metadata without performing an image recognition for the segment of the image data; and wherein the metadata is generated by the image capturing device according to time information provided to the image capturing device by a scoring device.

17. The method of claim 16, wherein:
the transmission at the second bandwidth utilizes a first lower resolution, a first lower frame rate or a combination thereof compared to the transmission at the first bandwidth; and
wherein the transmission at the third bandwidth utilizes a second lower resolution, a second lower frame rate or a combination thereof compared to the transmission at the second bandwidth.

18. The method of claim 16, wherein the video content is captured by a video camera and wherein the time information is provided to the video camera by the scoring device at the timed sporting event.

19. The method of claim 16, wherein the transmission of the video content comprises wireless communications, wired communications, or any combination thereof.

20. The method of claim 16, wherein the transmission of the video content comprises transmission via a network element of the communication system.

* * * * *